United States Patent
De Oliveira Kastrup Pereira et al.

(10) Patent No.: US 7,290,157 B2
(45) Date of Patent: Oct. 30, 2007

(54) CONFIGURABLE PROCESSOR WITH MAIN CONTROLLER TO INCREASE ACTIVITY OF AT LEAST ONE OF A PLURALITY OF PROCESSING UNITS HAVING LOCAL PROGRAM COUNTERS

(75) Inventors: Bernardo De Oliveira Kastrup Pereira, Eindhoven (NL); Vishal Suhas Choudhary, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/515,154

(22) PCT Filed: Apr. 28, 2003

(86) PCT No.: PCT/IB03/01731

§ 371 (c)(1),
(2), (4) Date: Nov. 19, 2004

(87) PCT Pub. No.: WO03/100601

PCT Pub. Date: Dec. 4, 2003

(65) Prior Publication Data

US 2005/0229018 A1    Oct. 13, 2005

(30) Foreign Application Priority Data

May 24, 2002  (EP) .................... 02077040

(51) Int. Cl.
*G06F 1/26*  (2006.01)
(52) U.S. Cl. ......................... 713/324; 712/10
(58) Field of Classification Search ............ 713/324
See application file for complete search history.

(56) References Cited

U.S. PATENT DOCUMENTS 6,070,003 A * 5/2000 Gove et al. ............ 710/317

(Continued)

FOREIGN PATENT DOCUMENTS

EP    0962856 A3    7/2000

(Continued)

OTHER PUBLICATIONS

Robert P. Colwell, et al: Architecture and Implementation of a VLIW Sumercomputer, IEEE, 1990, pp. 910-919.

*Primary Examiner*—Chun Cao
*Assistant Examiner*—Albert Wang
(74) *Attorney, Agent, or Firm*—Paul Im

(57) ABSTRACT

A processor comprises a main controller (CTR11) and a plurality of processing units (1–9). Each processing unit (1–9) has a local controller (CTR1–CTR9) and at least one functional unit (FU1–FU9) controllable by the local controller (CTR1–CTR9). The local controller (CTR1–CTR9) of a processing unit (1–9) is coupled (15) to the main controller (CTR11). The processor further comprises an instruction set, having at least one instruction for increasing the activity of at least one processing unit (1–9). The main controller (CTR11) is arranged to process the at least one instruction for increasing the activity of at least one processing unit (1–9). One or more processing units (1–9) of the processor can be completely switched off, including the corresponding local controller (CTR1–CTR9), since the instructions for switching on a processing unit (1–9) are not processed by the corresponding local controller (CTR1–CTR9), but by the main controller (CTR11) itself.

8 Claims, 1 Drawing Sheet

U.S. PATENT DOCUMENTS

| | | |
|---|---|---|
| 6,170,051 B1 | 1/2001 | Dowling |
| 6,219,796 B1 * | 4/2001 | Bartley ........................ 713/320 |
| 6,307,281 B1 * | 10/2001 | Houston ....................... 307/31 |
| 6,477,654 B1 * | 11/2002 | Dean et al. .................. 713/300 |
| 6,625,740 B1 * | 9/2003 | Datar et al. .................. 713/324 |
| 6,772,355 B2 * | 8/2004 | Homewood et al. ........ 713/320 |

FOREIGN PATENT DOCUMENTS

| | | |
|---|---|---|
| WO | 0116718 A1 | 3/2001 |

* cited by examiner

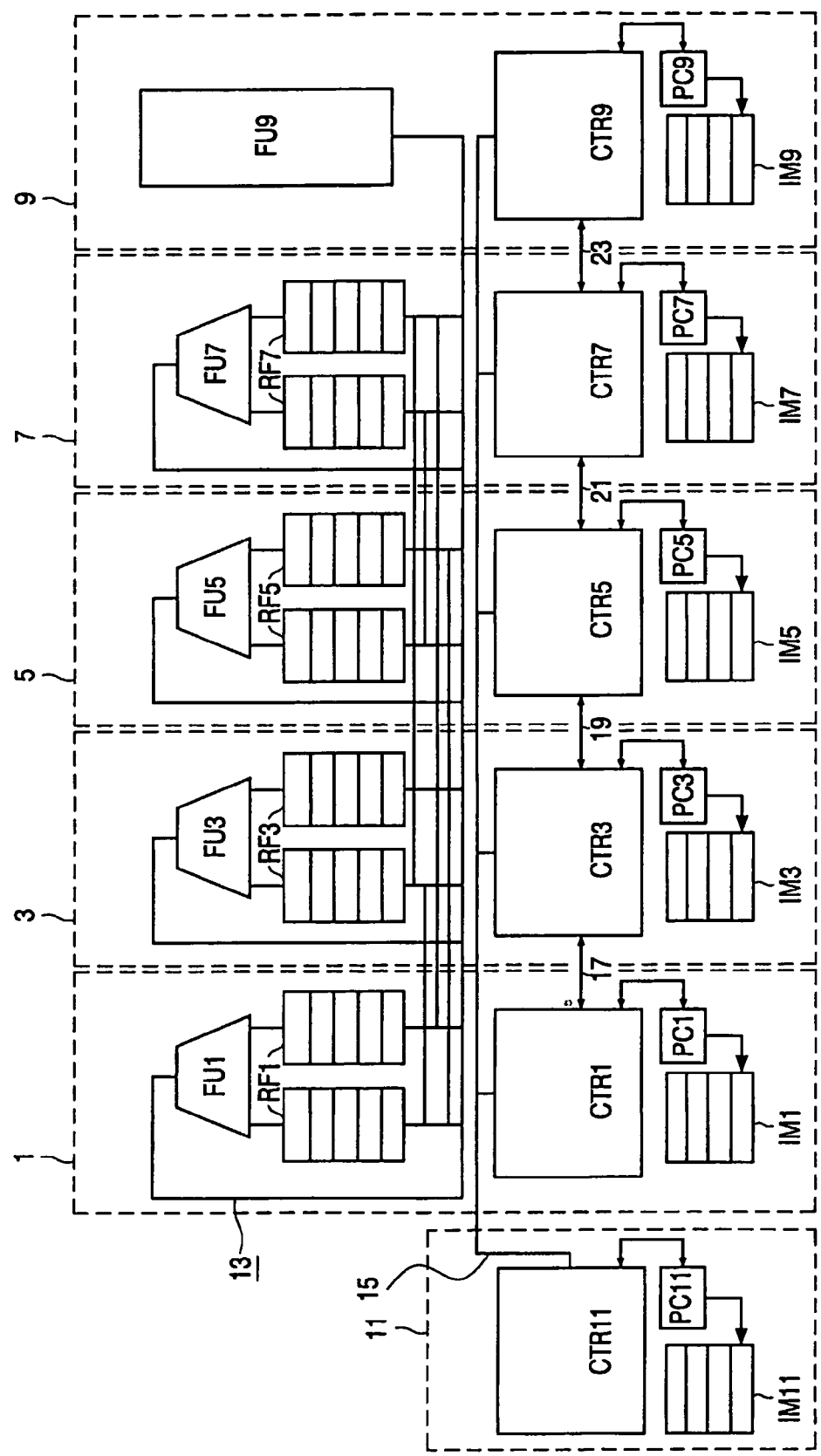

CONFIGURABLE PROCESSOR WITH MAIN CONTROLLER TO INCREASE ACTIVITY OF AT LEAST ONE OF A PLURALITY OF PROCESSING UNITS HAVING LOCAL PROGRAM COUNTERS

TECHNICAL FIELD

The present invention relates to a processor comprising a main controller; a plurality of processing units, each processing unit comprising a local controller and at least one functional unit controllable by the local controller, the local controller being coupled to the main controller; an instruction set having at least one instruction for increasing the activity of at least one processing unit.

BACKGROUND

Concurrent processing allows increasing the performance of a processor, and requires some form of parallelism to be introduced in the processor architecture. A processor can exploit two forms of parallelism. The first is instruction-level parallelism, in which more than one instruction at a time is executed within one task. The second concerns task-level parallelism, in which multiple tasks are executed simultaneously by the processor. The application that has to be executed determines the amount of instruction-level parallelism and task-level parallelism that can be maximally exploited.

Configurable processors are pre-fabricated devices that can be customized to perform a specific function. An example of a configurable processor is a scaleable VLIW (Very Large Instruction Word) processor, i.e. a VLIW processor with a large number of functional units. A VLIW processor allows exploiting instruction-level parallelism in programs and thus executing more than one instruction at a time. Multiple, independent functional units are used to execute multiple operations in parallel. VLIW processors carry out multiple functional unit operations in response to one very long instruction. Each VLIW effectively configures the data path of the processor for computations in space, i.e. in parallel.

The flexibility of a VLIW processor can be improved by allowing the processor to execute multiple tasks in parallel and thus exploiting task-level parallelism, if present in an application. In case of a traditional VLIW processor only a single task can be executed, due to the presence of only a single controller with a corresponding single program counter. VLIW processors with partitioned controllers, however, are capable of exploiting task-level parallelism, and this principle is described in *Architecture and implementation of a VLIW supercomputer*, Colwell R. et. al., Proc. of Supercomputing '90, New York, N.Y., USA, 12–16 Nov. 1990. Each controller controls a segment of the processor and in principle two operation modes are possible. In the first mode the controllers operate independently, while in the second mode all controllers are locked together. In the first mode the net effect is that of having a multi-processor system, allowing executing multiple tasks simultaneously and thus exploiting task-level parallelism. In the second mode, a classical VLIW processor is obtained. It is possible to switch between both modes during computation.

A problem associated with the introduction of parallelism in a processor architecture, among others, is related to the increase in number of functional units and the corresponding increase in communication overhead, as this may result in unnecessary power dissipation if these resources can not be fully used at a given moment in time. For example, in case of a scaleable VLIW processor with partitioned controllers, functional units will remain unused if not sufficient instruction-parallelism or task-level parallelism is present in a specific application. These functional units may still consume a significant amount of power.

The VLIW processor of U.S. Pat. No. 6,219,796 has processing units that have been made responsive to a dedicated instruction, e.g. a SLEEP instruction, which at least partially powers down the associated execution unit. The execution units are made active again either by another dedicated instruction, e.g. a WAKE instruction, or by the receipt of an active, i.e. a non-SLEEP instruction. Consequently, the active configuration of the processor can be altered by dedicated instructions present in the instruction flow of VLIWs, resulting in a reduction of the power consumption by the active processor. The dedicated instructions are inserted into a VLIW by the compiler. This is realized by first detecting a segment of inactive instructions, e.g. NOPS, for a given functional unit and, subsequently, replacing the first inactive instruction in the segment by, for example, a SLEEP instruction, and replacing the last inactive instruction in the segment with a WAKE instruction.

It is a disadvantage of the prior art processor that a processing unit cannot be completely switched off. Some control logic will have to remain powered in order to be able to process the instruction for making the processing unit active again.

DISCLOSURE OF INVENTION

An object of the invention is to provide a processor architecture that allows completely switching off one or more processing units. This object is achieved with a processor of the kind set forth, characterized in that the main controller is arranged to process the at least one instruction for increasing the activity of at least one processing unit.

One or more processing units of the processor can be completely switched off, including the corresponding local controller, since the instructions for switching on a processing unit are not processed by the corresponding local controller, but by the main controller itself. Leakage currents are avoided in a completely switched off processing unit. During computation of an application, processing units can be switched off and subsequently switched on by the main controller, depending on the amount of instruction-level parallelism and task-level parallelism present in the application at a given moment in time. Furthermore, performance can be traded for reduction in power consumption. In case of computing an application requiring low power consumption, this can be achieved by completely switching off one or more processing units, and thus reducing the power consumption, at the expense of performance.

An embodiment of the invention is characterized in that the instruction set further has at least one instruction for reducing the activity of at least one processing unit, and the main controller is arranged to process the at least one instruction for reducing the activity of at least one processing unit. An advantage of this embodiment is that by executing one instruction the activity of multiple processing units can be reduced simultaneously. Furthermore, the complexity of the local controllers is reduced.

An embodiment of the invention is characterized in that the instruction for decreasing the activity of at least one processing unit is an instruction for completely switching off the processing unit, and the instruction for increasing the activity of at least one processing unit is an instruction for completely switching on the processing unit. In case of a processor with a large number of processing units, some of the processing units may remain unused if not sufficient instruction-level parallelism or task-level parallelism is present in a specific application. These processing units may still consume a considerable amount of power and by completely switching off one or more processing units, unnecessary power consumption is prevented. An advantage of this embodiment is that the operation to switch off or on one or more processing units can be implemented in the hardware of the main controller, reducing the VLIW size and decreasing the response time for switching off and on a processing unit.

An embodiment of the invention is characterized in that the processing unit further comprises a local instruction memory. An advantage of this embodiment is that it in case a processing unit is switched off, the corresponding local instruction memory can be switched off as well.

An embodiment of the invention is characterized in that the processing unit further comprises a local program counter. The local program counter allows a processing unit to operate independently of other processing units.

An embodiment of the invention is characterized in that at least one processing unit further comprises a register file, the register file being accessible by the functional unit. A register file is used for storing input data of a functional unit and allows fast access to these data, increasing the performance of a processor.

An embodiment of the invention is characterized in that the register file is a distributed register file. An advantage of a distributed register file is that it requires less read and write ports per register file segment, resulting in a smaller register file bandwidth. Furthermore, it improves the scalability of the processor, when compared to a central register file.

An embodiment of the invention is characterized in that the processor further comprises a communication network for coupling the functional units of the processing units and the register files of said processing units. A communication network allows directly passing an output value from a functional unit to a register file, increasing the performance of the processor.

An embodiment of the invention is characterized in that the communication network is a partially connected communication network, i.e. not each functional unit of the processing units and each register file of said processing units are coupled. The use of a partially connected network reduces the code size, due to less addressable registers, as well as the power consumption. Furthermore, it improves the scalability of the processor when compared to a fully connected network.

An embodiment of the invention is characterized in that the processor is a configurable processor. An advantage of a configurable processor is its flexibility, since the processor can be customized to compute on a certain domain of applications, instead of only on a specific application.

BRIEF DESCRIPTION OF THE DRAWINGS

The features of the described embodiments will be further elucidated and described with reference to the drawing:

The single FIGURE is a schematic diagram of a VLIW processor in accordance with an embodiment of the present invention.

DESCRIPTION OF PREFERRED EMBODIMENTS

Referring to the FIGURE, a schematic block diagram illustrates a VLIW processor, comprising a plurality of processing units 1–9 and a main control unit 11. Each processing unit 1–7 has a corresponding functional unit FU1–FU7, a corresponding register file RF1–RF7, a corresponding local controller CTR1–CTR7, a corresponding local program counter PC1–PC7 and a corresponding local instruction memory IM1–IM7. Each register file RF1–RF7 is accessible by its corresponding functional unit FU1–FU7. Processing unit 9 has a functional unit FU9, a controller CTR9, a local program counter PC9 and a local instruction memory IM9. The main control unit 11 has a main controller CTR11, a program counter PC11 and an instruction memory IM11. The processor further comprises a communication network 13 for coupling the functional units FU1–FU9 and the register files RF1–RF7, allowing to pass values from the output of the functional units FU1–FU9 to the register files RF1–RF7. The main controller CTR11 is coupled to the local controllers CTR1–CTR9 via a connection 15. The local controllers CTR1–CTR9 are coupled to each other via connections 17–23.

Each local controller CTR1–CTR9 controls its corresponding processing unit 1–9. The main controller CTR11 controls the main control unit 11. The compiler partitions the VLIW issued to the processor into six segments, and each segment is issued to one of the instruction memories IM1–IM11. Each local instruction memory IM1–IM9 holds the instructions to be processed by the corresponding local controller CTR1–CTR9. The local program counter PC1–PC9 refers to the address of the corresponding local instruction memory IM1–IM9, where the next instruction to be processed is stored. The local controllers CTR1–CTR9 fetch the next instruction to be executed from the corresponding local instruction memory IM1–IM9 and decode the instruction. Subsequently, the resulting operation code and register addresses are issued to the corresponding functional unit and register file, respectively. The instructions to be processed by the main control unit 11 are stored in the instruction memory IM11. The program counter PC11 refers to the address of the instruction memory IM11, where the next instruction to be processed by the main controller CTR11 is stored. The main controller CTR11 fetches the next instruction to be executed from the instruction memory IM11, decodes the instruction and performs the operations.

In a first mode of operation, the local controllers CTR1–CTR9 run in a so-called lock-step mode. This mode is preferably achieved by making all local program counters PC1–PC9 point to the same logical address of the corresponding local instruction memory IM1–IM9. The actual local program counter PC1–PC9 is determined by one of the local controllers CTR1–CTR9, and passed to the other local controllers, via the connections 17–23. Since instructions are fetched from the same logical address of the local instruction memory IM1–IM9, the processor effectively executes one VLIW in only one task and therefore behaves as a classical VLIW processor. In a second mode of operation each local controller CTR1–CTR9 works independently, determining its own value for the local program counter used for fetching the instructions. In this mode of operation a multi-processor system exists, capable of computing five independent tasks in parallel. In different modes of operation, combinations of the first and second mode of operation are possible. For example, local controllers CTR1 and CTR3 can run in lock-step mode, executing their own task and capable of exploiting a limited degree of instruction-level parallelism. The local controllers CTR5–CTR9 can run in lock-step mode as well, also executing their own task. In this mode, the processor executes two independent tasks and within each task a limited degree of instruction-level parallelism can be exploited, as compared to the first mode of operation where all local controllers CTR1–CTR9 run in lock-step mode.

The main controller processes instructions for reducing the activity as well as instructions for increasing the activity of one or more processing units. The instructions held in instruction memory IM11 contain several fields, indicating the type of operation that has to be performed by the main controller CTR11, and for which local controller this operation holds. For example, in case the activity of processing units 1 and 3 has to be reduced, an operation called "SLEEP" can be used. This can be realized with an instruction, issued to instruction memory IM11, which contains a field "SLEEP" and other bit fields indicating that this instruction only holds for processing unit 1 and 3. Alternatively, the operation can be encoded in a pre-determined field of the instruction, indicating for which processing unit the operation holds. The main controller CTR11 reads the instruction from instruction memory IM11, decodes the instruction and subsequently reduces the activity of the processing units 1 and 3. At a later moment in time, the activity of the processing units 1 and 3 can be increased, by an operation called "WAKE". That instruction, issued to instruction memory IM11, contains a field "WAKE" and other bit fields indicating that this instruction only holds for processing unit 1 and 3. The main controller CTR 11 reads the instruction from instruction memory IM11, decodes the instruction and subsequently increases the activity of processing units 1 and 3.

The compiler detects if a processing unit will have a segment of inactive instructions. This may be the case if the given application does not have sufficient instruction-level parallelism or task-level parallelism to schedule active instructions for all processing units. At the beginning of the segment of inactive instructions, an instruction is added to the VLIW to reduce the activity of the corresponding processing unit, and the main control unit 11 processes the latter instruction. At the end of the segment of inactive instructions of a processing unit, an instruction is added to the VLIW to increase the activity of the corresponding processing unit and the latter instruction is processed by the main control unit 11. This instruction may also be added before the end of the segment of inactive instructions in order to allow the processing unit to have more time for increasing its activity, before active instructions are scheduled for that processing unit. The instruction issued to the main control unit 11 may also cause two or more processing units simultaneously to reduce their activity. Subsequently, the instructions causing to increase their activity may be executed at different points in time, depending on the size of their segments of inactive instructions.

In a preferred embodiment the "SLEEP" operation completely switches off one or more processing units 1–9, while the operation "WAKE" completely switches on one or more processing units 1–9. An advantage of this embodiment is that it allows achieving the highest reduction in power consumption, as also the corresponding local controller, the corresponding register file and the corresponding local instruction memory of a processing unit are powered down. Processing units can be completely switched off, since the instructions for switching on a processing unit do not have to be processed by the corresponding local controller, but by the main controller CTR11. Leakage currents in a processing unit are avoided as a result of the complete switching off. It is a further advantage of this embodiment that it allows trading performance for reduction in power consumption. In case of computing an application requiring low power consumption, this can be achieved by completely switching off one or more processing units, and thus reducing the power consumption, at the expense of performance. In other embodiments, the "SLEEP" operation will only switch off selected parts of one or more processing units 1–9 and the "WAKE" operation will only switch on selected parts of one or more processing units 1–9. For example, a "SLEEP" operation may only switch off the functional unit as well as the corresponding local controller of one or more processing units. An advantage of this embodiment is that, at the moment a "WAKE" operation is applied, the response time to become ready for use is shorter when compared to a completely switched off processing unit. Furthermore, the local instruction memory can hold its stored instructions, even if it is a volatile type of memory. In another embodiment the local instruction memory may be of a non-volatile type, such as ROM, and this makes it possible to also switch off the local instruction memory without losing data.

In different embodiments, the instructions processed by the main controller 11 may only contain bit fields, for controlling which of the processing units 1–9 should be switched off or switched on. The operations that have to be performed are fixed and implemented in the hardware of the main controller CTR11. An advantage of this embodiment is that it reduces the VLIW size and decreases the response time for switching off and on a processing unit.

In other embodiments, several types of instructions can be defined in one instruction set to place processing units into different states of reduced activity. For example, two power down instructions can be defined to reduce the activity of a fully active processing unit: one placing the processing unit in a state in which it is partially deactivated and a second one completely switching off the processing unit. A fully active processing unit can be switched off in one step by means of the second power down instruction or in two consecutive steps by means of the first power down instruction followed by the second power down instruction. Furthermore, two power up instructions can be defined to increase the activity of a processing unit, when completely switched off: one placing the processing unit in a state in which it is partially activated, and a second one causing the processing unit to be fully active. The powering up of a completely switched off processing unit can be done in one step by means of the second power up instruction or in two consecutive steps by means of the first power up instruction followed by the second power up instruction. In this embodiment one or more processing units can be placed in a state in which they consume more power when compared to a complete switch off, but have a shorter response time to become ready for use again. An advantage of this embodiment is that, by placing the processing unit in a state in which it is partially activated, the delay time necessary for restoring complete activity is reduced.

In other embodiments, the instruction for reducing the activity of one of the processing units 1–9, is issued directly to its corresponding local instruction memory IM1–IM9 and processed by its corresponding local controller CTR1–CTR9. Subsequently, the main controller may place the processing unit in a more active state, by processing the instruction for increasing the activity of one or more processing units. An advantage of this embodiment is that it reduces the complexity of the main controller CTR11 as well as the communication overhead between the main controller CTR11 and the local controllers CTR1–CTR9. A local controller can completely switch off its corresponding processing unit, so including itself, since the main controller CTR11 can always place the processing unit in a more active state.

In an advantageous embodiment, the processing units 1–9 have a corresponding register file RF1–RF7 for storing input data of a functional unit and allowing fast access to these data.

In a preferred embodiment, the register files RF1–RF7 are distributed register files, i.e. several register files, each for a limited set of functional units, are used instead of one central register file for all functional units FU1–FU9. An advantage of a distributed register file is that it requires less read and write ports per register file segment, resulting in a smaller register file bandwidth. Furthermore, it improves the scalability of the processor when compared to a central register file.

In an advantageous embodiment, a communication network 13 is present, which couples the functional units FU1–FU9 and the register files RF1–RF7. The communication network 13 allows directly passing an output value of one of the functional units FU1–FU9 to one of the register files RF1–RF7.

In a preferred embodiment, the communication network 13 is a partially connected communication network, i.e. not each functional unit FU1–FU9 is coupled to each register file RF1–RF7. The use of a partially connected communication network reduces the code size as well as the power consumption, and also allows increasing the performance of the processor. Furthermore, it improves the scalability of the processor when compared to a fully connected communication network.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A processor comprising:
a main control unit including a main controller, a main program counter, and a mare instruction memory, the main instruction memory addressed by a main program counter;
a plurality of processing units, each processing unit comprising a local instruction memory addressed by a local program counter, a local controller and at least one functional unit controllable by the local controller, the local controller being coupled to the main controller; and
an instruction set stored in the main instruction memory having at least one instruction for increasing the activity of at least one processing unit; characterized in that the main controller is arranged to receive an address within the main instruction memory from the main program counter, the main controller is further arranged to process the at least one instruction.

2. A processor according to claim 1 wherein:
the instruction set further has at least one instruction for reducing the activity of at least one processing unit;
the main controller is arranged to process the at least one instruction.

3. A processor according to claim 2 wherein:
the instruction for decreasing the activity of at least one processing unit is an instruction for completely switching off the processing unit;
the instruction for increasing the activity of at least one processing unit is an instruction for completely switching on the processing unit.

4. A processor according to claim 1 wherein:
at least one processing unit further comprises a register file, the register file being accessible by the functional unit.

5. A processor according to claim 4 wherein:
the register file is a distributed register file.

6. A processor according to claim 4 wherein:
the processor further comprises a communication network for coupling the functional units of the processing units and the register files of said processing units.

7. A processor according to claim 6 wherein:
the communication network is a partially connected communication network.

8. A processor according to claim 1 wherein:
the processor is a configurable processor.

* * * * *